| United States Patent [19] | [11] 3,915,904 |
|---|---|
| Tonkyn et al. | [45] Oct. 28, 1975 |

[54] WATER-SOLUBLE CATIONIC POLYMERIC MATERIALS AND THEIR USE

[75] Inventors: Richard G. Tonkyn, Frenchtown, N.J.; Norman V. Vorchheimer, Paoli, Pa.; William J. Fowler, Jr., Berlin, N.J.; Richard A. Heberle, Holland, Pa.

[73] Assignee: Betz Laboratories, Inc., Trevose, Pa.

[22] Filed: July 19, 1973

[21] Appl. No.: 380,640

Related U.S. Application Data

[62] Division of Ser. No. 283,889, Aug. 25, 1972.

[52] U.S. Cl............ 260/2 BP; 210/54; 260/29.2 EP
[51] Int. Cl.²................... C08G 65/26; C08L 79/00
[58] Field of Search.................... 260/2 BP, 29.2 EP

[56] References Cited
UNITED STATES PATENTS

| 2,898,310 | 8/1959 | Greer | 260/2.1 |
| 3,248,353 | 4/1966 | Coscia | 260/29.2 |
| 3,725,312 | 4/1973 | Panzer | 260/2 BP |

FOREIGN PATENTS OR APPLICATIONS

| 1,083,681 | 9/1967 | United Kingdom |

*Primary Examiner*—Donald E. Czaja
*Assistant Examiner*—E. Nielsen
*Attorney, Agent, or Firm*—Alexander D. Ricci; Steven H. Markowitz

[57] ABSTRACT

The present disclosure is directed to novel water-soluble cationic polymers and their use either alone or in conjunction with coagulant aids to flocculate or coagulate matter suspended in aqueous systems. The novel polymer is prepared by reacting an alkylene polyamine with an epihalohydrin under specific conditions which include the incremental reaction of the epihalohydrin to fully react with the epihalohydrin and attain a polymer of uniform viscosity.

10 Claims, No Drawings

WATER-SOLUBLE CATIONIC POLYMERIC MATERIALS AND THEIR USE

This is a division of application Ser. No. 283,889, filed Aug. 25, 1972.

BACKGROUND OF THE INVENTION

The present invention is directed to a novel water-soluble cationic polymeric material and its use as a flocculant or coagulant for solid organic and/or inorganic matter suspended or dispersed in an aqueous medium.

As has been widely documented of late, cationic polymeric materials have found widespread use as coagulant aids for matter suspended in aqueous mediums. The specific utilities for these polymers are numerous and range from sewage and waste treatments to the clarification of influent waters for industrial boiler and cooling waters, to the beneficiation of ores. A brief description of the specific areas might perhaps be helpful in establishing the environment of the present invention.

The separation of liquids from solids or solids from liquids is a basic requirement in most municipal and industrial systems. For example, because of pollutional requirements and requirements for economic processing of aqueous waste streams, it has been necessary to treat both municipal and industrial waters to remove as much of the suspended organic and/or inorganic matter as possible. Similarly, in the ore processing and refining industries, as in some pulp and paper mill systems, it is necessary to remove fines and fibers from the aqueous systems in each to permit water conservation and reuse and/or to insure that the water is acceptable for discharge. Likewise, industrial and municipal influent water supplies generally must be clarified before use in the particular purposes, e.g. the clarification of water from streams for potable water supplies, boiler water for the production of steam, cooling water for cooling systems, etc. Without clarification, the water would, of course, contain undesirable debris, organic matter, suspended clay, mud, silt, etc.

Sedimentation, filtration, centrifugation and like processes, although acceptable in some instances, are generally too slow and costly when substantial volumes of water are to be treated. Therefore, in order to meet the demands for the latter situations, different methods utilizing unique materials such as the cationic polymers had to be developed, and were in fact developed successfully to meet these demands. These materials are currently functioning to provide the necessary and economic clarification of water.

Because of the success of various cationic polymeric materials, there has been a consistent increase in the effort to develop and produce materials which will operate to effectively coagulate or flocculate suspended matter more rapidly and at lower dosage rates to thereby provide improved economics because of more rapid activity at lower dosage rates.

Accordingly, it was the object of the present inventors to produce a material which would meet these prerequisites. In this regard, the present could be effectively achieved by utilizing a water-soluble cationic polymer obtained by the polymerization of an epihalohydrin with a specific family of alkylene polyamine, the polymerization being carried out under certain conditions and utilizing specific concentrations of the respective ingredients.

GENERAL DESCRIPTION OF THE INVENTION

The water-soluble cationic polymeric materials which were developed in accordance with the above and which are the subject of this application are those obtained by the polymerization of an epihalohydrin with an alkylene polyamine having the formula

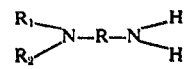

where R is a lower alkylene having from 2 to about 6 carbon atoms, e.g. ethylene ($-CH_2-CH_2-$) propylene, isopropylene, isopentyl, hexylene, etc.; $R_1$ and $R_2$ each are a lower alkyl of from about 1 to about 6 carbon atoms, e.g. methyl, ethyl, propyl, iospropyl, pentyl, hexyl, isohexyl, etc.

The mole ratios of the epihalohydrin to the alkylene polyamine used in accordance herewith are from about 0.60:1 to about 2.7:1, and preferably from 0.75:1 to 1.3:1. The polymerization is carried out at a temperature of from about 60° to about 120°C and preferably 80° to 110°C by reacting with the alkylene polyamine from about 50 to about 90 percent of the mole(s) of epihalohydrin to be polymerized. The reaction is allowed to take place for a time sufficient for the reaction medium obtained to attain a relatively uniform viscosity, or more specifically, when substantially all of the reactive sites of the epihalohydrin have had the opportunity to react. The latter condition is essentially the reason for the reaction medium ultimately reaching a relatively uniform viscosity. After the reaction medium has obtained the relatively uniform viscosity, the remaining portion of the epihalohydrin is then added to the reaction medium either totally or incrementally and allowed to react to achieve the final product of the desired viscosity. When the final viscosity of the reaction medium is attained, i.e. all or substantially all of the reactive sites of the epihalohydrin have reacted, the reaction medium is preferably stabilized by acidification of the medium to a pH of from 1 to about 7 and preferably 2 to 5. A mineral acid such as hydrochloric, sulfuric, nitric or phosphoric is preferred but not the only possibilities for this purpose. Strong organic acids may also be used.

In the present description, viscosity is utilized as the criterion rather than molecular weight simply for convenience since the polymerization is preferably carried out in aqueous medium of an alkaline pH, i.e. 7.5 to 12 and preferably 8 to 11. Accordingly, the reaction medium containing the water-soluble cationic polymer dissolved therein is more controllable utilizing the viscosity criterion.

Obviously, since the amount of water in the reaction medium will directly effect the viscosity of the reaction medium and the final product, this factor must be taken into consideration in order to achieve the desired viscosity of the cationic polymer solutions if in fact an aqueous solution of the cationic polymer is desired. The viscosities obtainable can range quite considerably, however, for the purposes of the present invention and specifically with respect to the utility, viscosities equivalent of from about 10 to about 2000 centipoises at a 20% concentration are the most preferred. "Equivalent" in this regard means that a 35% concentration, for example having a viscosity of 300 cps., can be diluted to a 20% concentration and have a viscosity of 75–100 cps. Accordingly, the concentration and the viscosity set forth above for a 20% concentration is not to be construed as limitative of the viscosity but should be considered as a frame of reference. The concentrations, for example, may range from 15 to 60% with their own particular viscosities. Accordingly, a 50% solution having a viscosity of 1000 which can be diluted to a 20% solution having a viscosity of 30 is also considered to be included in the scope of the invention.

As indicated earlier, the cationic polymer of the invention can also be obtained as a liquid composed solely of a reasonably pure polymer. In order to obtain polymer only, the aqueous solution can be vacuum distilled or evaporated by the film method to provide reasonably pure polymer. In some cases this may be desirable to avoid large expenditures or expenses in packaging and transporting low activity products (e.g. 20% polymer:80% water). The polymers prepared in the aforedescribed method and separated from the aqueous solvent generally will have a calculated molecular weight in the range of from about 4000 to about 50,000. The pure polymer can later, for example, after arriving at its destination, be redissolved in water to a predetermined activity to produce the utilizable concentration.

In describing the preferred procedure for preparing the polymers of the invention, it was stated in essence that "the remaining portion of the epihalohydrin is then added either totally or incrementally and allowed to react." Although either method may be utilized, the preferred method is the incremental addition of the remaining portion with sufficient time before addition of the remaining portion(s) being provided to allow substantially complete reaction of the epihalohydrin reactive sites. The most preferable method utilizing the incremental addition concept is to add and react the remaining epihalohydrin in decreasingly smaller amounts allowing time for substantially complete reaction which is determined by the obtention of a relatively uniform viscosity. The incremental addition not only provides a better control over ultimate viscosity of the reaction medium and molecular weight of the resulting polymer, but also insures that the highest activity of the polymer as a flocculent or coagulant is achieved by avoiding polymeric gel formations which possess generally no flocculating activity.

The epihalohydrins which are preferred for use for the present purposes are epichlorohydrin and epibromohydrin, while epifluorohydrin may be used.

The alkylene polyamines preferred within the present invention are any which are encompassed by the generic formula set forth earlier and basically may be described as those which have at least one tertiary amino group and at least one primary amino group. Illustrative of the compounds which are operable for the purpose are dimethylaminopropylamine (N,N-dimethyl propylene diamine); diethylaminopropylamine (N,N-diethylpropylene diamine); N,N-dimethylaminoethylamine; and N,N-diethylaminoethylamine.

The polymerization of epihalohydrin with alkylene polyamines as described above has been known for sometime as indicated by British Pat. No. 1,083,681. However, neither the reaction conditions of the instant invention nor the product as obtained thereby is disclosed, taught or suggested by that patent or others which have been considered. The polymer produced in the British patent is produced under conditions which seek to eliminate branching and cross-linking in order to insure that adequate quaternization in a later step is effected to produce the desired product.

The polymers of the instant invention do possess substantial branching and cross-linking and these apparently are necessary for the ultimate utility since polymers produced by the method of the British patent do not possess the capacity to flocculate or coagulate suspended matter in aqueous solutions. Accordingly, it must be assumed that the temperature of polymerization and the method of reaction effects a structural difference between the respective polymers.

A cationic polymer prepared in accordance with the present invention using equimolar proportions of epichlorohydrin and N,N-dimethyl-1,3-propanediamine is believed to have the following structure

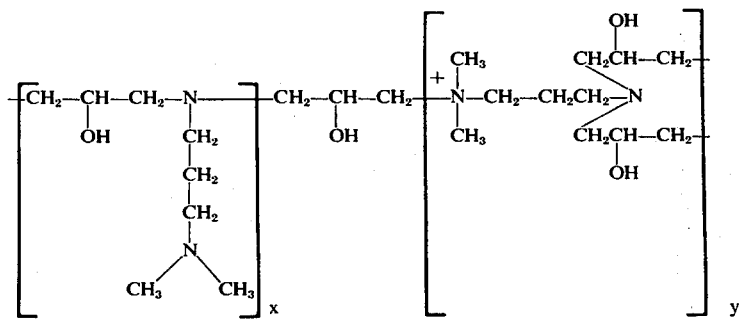

where $x$ is greater than $y$. However, as is well-known, it is difficult, if not impossible, to determine the exact chemical structure of an entire polymeric chain. Accordingly, in the present case, it is felt to be more accurate to describe the polymer by its method of preparation.

Having thus described the invention generally, specific embodiments are set forth below illustrating specific methods of preparation of the polymers and their respective activities.

SPECIFIC EMBODIMENTS

Example 1

To 471.0 g. of water in a 2 liter resin bottle equipped with thermometer, condenser and stirrer, was added 344.5 g. (3.38 mole) of N,N-dimethyl-1, 3-propane diamine. To this was added dropwise over 1 hour 275.2 (2.97 mole) of epichlorohydrin. The solution was heated at 90°C for 1 hour. Epichlorohydrin (29.1 g., 0.31 mole) was then added at 90°C in nine decreasingly smaller portions, the last one being 0.1 g. until the desired viscosity was reached. The viscosity was determined 20 minutes after each addition of epichlorohydrin by timing the flow of a fixed amount of solution through a pipette. The reaction was then terminated by lowering the pH to 2.5 by the addition of 530 g. of an aqueous sulfuric acid solution (½ w/w). The resulting solution had a solids content of 50% and a Brookfield viscosity (spindle 2, 12 RPM) of 912 cps. Dilution to 35% solids resulted in a Brookfield viscosity (spindle 1, 12 RPM) of 94 cps (mole ratio of epi to amine = 0.97:1).

Example 2

To 1089 g. of water in a 2 liter resin kettle equipped with stirrer, condenser and thermometer was added 229.5 g. (2.25 mole) of N,N-dimethyl-1,3-propane diamine. Then 183.5 g. (1.98 mole) of epichlorohydrin was added dropwise over 1 hour. The solution was heated at 90°C for 1 hour, and then epichlorohydrin added at 90°C in seven portions. A total of 40 g. of epichlorohydrin was added in decreasingly smaller amounts. Twenty minutes after each addition, the viscosity change was determined by timing the flow of a fixed amount of solution through a pipette. After this epichlorohydrin was added, 200 g. of water was added to dilute the polymer. Then an additional 0.47 g. of epichlorohydrin was added to achieve the desired viscosity, followed by 320 g. of $H_2SO_4$ solution (½ w/w with $H_2O$), which lowered the pH to about 2.5 and terminated the reaction. Finally, the solution was poured into 742.5 g. of water giving a solids content of 20% and a Brookfield viscosity, spindle 1, 12 RPM of 175 cps (mole ratio of epi to amine = 1.08:1).

Example 3

To 1089 g. of $H_2O$ in a 2 liter 4 neck resin flask equipped with thermometer, condenser, and stirrer, was added 229.5 g. (2.25 mole) of N,N-dimethyl-1,3-propane diamine. Then 133.5 g. (1.44 mole) of epichlorohydrin was added dropwise over 1 hour. The solution was heated at 90°C for 1 hour, then epichlorohydrin was added in 8 gradually decreasing portions at 90°C. After each addition of epichlorohydrin, the solution was stirred 20 minutes, and the viscosity determined by timing the flow of a fixed amount of solution through a 10 ml. pipette. When the desired viscosity was reached, which required 100.3 g. (1.00 mole) of epichlorohydrin, 227 g. of sulfuric acid solution (1:2 w/w) and 917.5 g. of $H_2O$ were added, and the solution filtered to remove some insoluble gel. The final solids were 20% with a Brookfield viscosity (spindle 2, 12 RPM) of 2100 cps (mole ratio epi to amine = 1.12:1).

Example 4

To 51.0 g. (0.50 mole) of N,N-dimethyl-1,3-propane diamine in 638 g. of water was added 40.3 g. (0.435 mole) of epichlorohydrin (EPI) at a rate such that the temperature did not exceed 90°C. The resulting solution was heated at 90°C for 1 hour. Then 35.4 g. (0.38 mole) of EPI was added in small portions to build viscosity, with the solution being heated for 20 minutes at 90°C after each addition. The viscous solution was then diluted with 445 g. of water, and 6.4 g. of concentrated sulfuric acid was added to reduce the pH to 6.5. Then 50.1 g. (.54 mole) of EPI was added, again in small portions, with 20 minute reaction times at 90°C between portions, followed by 510 g. of water. Additional amounts of EPI showed no signs of reaction or viscosity increase. The final solution had a pH of 6.0 and a viscosity (Brookfield spindle 2, 12 RPM) of 890 cps, and solids of 10.3%. Mole ratio of epi to amine =2.7:1.

Examples 5 through 11

The polymers of Example 5 through 11 were prepared in accordance with the method as set forth in Example 1 utilizing the same reactants. The mole ratio of the reactants were varied as indicated in the following Table. The viscosity of the final products also were different depending upon the amount of water contained in the final product. These differences in final viscosity were purposely generated to establish efficacy differences, if any, in the clarification tests, the results of which are reported later herein.

TABLE 1A

| Product of | Mole Ratio of Epi : Amine | % Solids | Viscosity Brookfield Spindle 2: 12 RPM |
|---|---|---|---|
| Example 5 | 1.03:1 | 20 | 950 |
| Example 6 | 1.07:1 | 20 | 500 |
| Example 7 | 1.04:1 | 20 | 300 |
| Example 8 | 0.98:1 | 50 | 620 |
| Example 9 | 1.03:1 | 35 | 250 |
| Example 10 | 0.98:1 | 50 | 250 |
| Example 11 | 1.07:1 | 20 | 400 |

Examples 12 through 21

Products of Examples 12 through 21 were produced in pilot plant batches to ascertain whether the effectiveness of the products was preserved. The mole ratios of the reactant used are set forth in following Table 1B together with the solids content of the products and their respective viscosities. As in the previous Examples, the water content of the products was varied.

TABLE 1B

| Product of | Mole Ratio of Epi : Amine | % Solids | Viscosity Beckman Spindle 2, 12 RPM |
|---|---|---|---|
| Example 12 | 1:1 | 35 | 240 |
| Example 13 | 1:1 | 35 | 125 |
| Example 14 | 1:1 | 36 | 1415 |
| Example 15 | 1:1 | 36 | 100 |
| Example 16 | 1:1 | 35 | 90 |
| Example 17 | 1:1 | 35 | 102 |
| Example 18 | 1:1 | 35 | 88 |
| Example 19 | 1:1 | 35 | 78 |
| Example 20 | 1:1 | 35 | 76 |
| Example 21 | 1:1 | 35 | 80 |

The new products produced as set forth in the foregoing Examples were tested extensively for flocculation in Lower Natchez Valley Authority River water, Mississippi River water, and Delaware River water. In accordance with the test procedure, the river water tested is measured for turbidity with the test procedure, the river water tested is measured for turbidity using a Jackson Turbidity Unit (JTU). The turbidity of the river water is then measured after various dosages with the polymer. A lower turbidimeter reading represents greater clarification of water. Analysis of various river waters established that the suspended particles contained therein were composed of materials, such as muds, silts, siliceous materials, organic matter and debris such as wood chips and vegetation. The Lower Natchez Valley Authority River water contained, for example, significant quantities of waste lignins and tannins as well as minerals, silt, mud, etc.

The data determined from the testing technique as tabulated in Table 2 illustrate quite clearly that the inventive polymers are effective in waters of low turbidity and high turbidity ranging from Delaware River water having a relatively low initial turbidity value of 27 JTU to the Lower Natchez Valley Authority Water having an initial turbidity of 260 JTU.

The inventive polymers tested in conjunction with other coagulant aids such as lime, water soluble ferric salt i.e. ferric sulfate, ferric chloride, bentonite, alum, polyaluminum chloride, compounds and their equivalents, (note e.g. U.S. Pat. No. 3,544,476) and clay and the like aids also proved to be not only effective, but also compatible with the aids. Unlike most cationic polymers, the polymers of the present invention are completely compatible from a composition point of view. More specifically, the present polymers can be blended directly with the coagulant aids without loss of coagulation activity of either the polymer or the aid. A one composition treatment, although a two is also acceptable, possesses the advantages of less transportation costs and less handling requirements during production and use. The compositions preferably contain a weight ratio of polymer to coagulant aid of from about 1:0.50 to 1:50.

TABLE 2

Water from Lower Natchez Valley Authority

| Product of | Dosage (ppm) | Turbidity (JTU) |
|---|---|---|
|  |  | Initial = 60 |
| Example 5 | 4.5 | 17.5 |
| Example 5 | 4.0 | 19 |
| Example 5 | 3.5 | 25 |
|  |  | Initial = 54 |
| Example 5 | 4.0 | 12 |
| Example 5 | 4.5 | 12 |
| Example 3 | 3.0 | 18 |
| Example 3 | 3.5 | 13 |
| Example 3 | 4.0 | 9 |
| Example 3 | 4.5 | 7 |
|  |  | Initial = 42 |
| Example 5 | 0.75 | 23 |
| Example 5 | 1.0 | 14 |
| Example 3 | 0.75 | 24 |
| Example 3 | 1.0 | 15 |
| Example 6 | 0.75 | 26 |
| Example 6 | 1.0 | 16 |
| Example 7 | 0.75 | 24 |
| Example 7 | 1.0 | 15 |
| Example 11 | 0.75 | 27 |
| Example 11 | 1.0 | 18 |
|  |  | Initial = 260 |
| Example 3 | 4.0 | 20 |
| Example 3 | 5.0 | 12 |
| Example 8 | 4.0 | 22.5 |
| Example 8 | 5.0 | 10.5 |
| Example 9 | 5.0 | 11.5 |
| Example 1 | 5.0 | 13 |
| Example 10 | 5.0 | 15 |
|  |  | Initial = 53 (30 ppm bentonite added each sample) |
| Example 12 | 7.5 | 25 |
| Example 12 | 10.0 | 15 |
| Example 13 | 7.5 | 28 |
| Example 13 | 10.0 | 15 |
| Example 14 | 7.5 | 34 |
| Example 14 | 10.0 | 17 |
| Example 15 | 7.5 | 27.5 |
| Example 15 | 10.0 | 17 |
| Example 16 | 7.5 | 26 |
| Example 16 | 10.0 | 15 |
|  |  | Initial = 50 |
| Example 17 | 5.0 | 13 |
| Example 18 | 5.0 | 13 |
| Example 19 | 5.0 | 11 |
|  |  | Initial = 66 |

TABLE 2-Continued

Water from Lower Natchez Valley Authority

| Product of | Dosage (ppm) | Turbidity (JTU) |
|---|---|---|
| Example 4 | 7.5 | 44 |
| Example 4 | 10.0 | 32 |
| Example 4 | 12.5 | 26 |
| Mississippi River Water |  | Initial = 78 |
| Example 16 | 0.25 | 17 |
| Example 16 | 0.5 | 13 |
| Example 20 | 0.25 | 16 |
| Example 20 | 0.5 | 17 |
|  | (with 90 ppm CaO, 10 ppm $Fe_2(SO_4)_3$) |  |
| Sabine River Water |  | Initial = 45 (with 30 ppm clay) |
| Example 16 | 7.5 | 32 |
| Example 16 | 8.5 | 26.5 |
| Example 16 | 10 | 18 |
| Delaware River Water |  | Initial = 27 (with 15 ppm bentonite) |
| Example 13 | 0.5 | 14 |
| Example 13 | 0.75 | 7 |
| Example 12 | 0.5 | 13 |
| Example 12 | 0.75 | 7.5 |

In order to ascertain the effectiveness of the polymers of the invention as coagulants for organic type waste streams, samples derived from an aqueous waste stream containing polyvinyl chloride (PVC) waste from a polymeric production facility were subjected to various dosages (5, 10, 25 ppm) of a polymer prepared in accordance with Example 1.

The results of the tests clearly indicated that the polymers were effective in coagulating the PVC waste and thereby clarifying the water sample.

Another quite important feature was also observed. Many polymers, additives and coagulant aids have the capacity to clarify aqueous systems, however, many of these treatments have not proven to be acceptable because the sludge (the coagulated suspended material) was not satisfactory because of volume, quality (easily resuspended), not easily dewatered, or remaining suspended matter was not easily filtered. This, of course, is an extremely important criteria for any treatment, since it can be appreciated that quality of sludge is of utmost significance due to the quantity involved. Accordingly, the more easily handled the sludge is, the more acceptable it is. The sludge obtained from the treatment of the PVC waste was quite satisfactory since the volume was significantly reduced in comparison with the treatment previously used.

Respective samples of waste water containing paint latex, plastisol latex, combinations of the two and raw sewage were subjected to various dosages (5, 10, 25 and 50 ppm) of a polymer such as that obtained in accordance with Example 1.

In each instance the polymer was quite effective in flocculating the suspended matter and, in addition, provided a sludge which was acceptable because of ease of separability from the supernatant.

The polymers of the invention were also evaluated in the clarification of separate waste streams from a paper mill.

The first waste stream contained suspended dye pigment wastes obtained from the production of fiberboard. A polymer similar to that of Example 1 utilized at a 1 to 2 ppm level was quite effective in coagulating the suspended dye pigments and clarifying the aqueous system to an acceptable degree.

Similarly, a pulp mill waste stream containing softwood fines and fiber was clarified to an impressive and an acceptable degree using a treatment of from about 1 to about 2 ppm of a polymer such as that of Example 1.

Polymers of the invention (Example 1) were also evaluated alone and in conjunction with standard coagulant aids such as ferric compounds (ferric sulfate and ferric chloride) in combination with lime treatment, bentonite, alum, clay, a basic metal salt (e.g. polyaluminum chlorides and derivatives thereof) having the formula $$M_n(OH)_m X_{3n-m}$$

wherein M is from the group consisting of tri or more valent metals [e.g. aluminum, chromium, iron (ferric)], X is an anion selected of Cl, $NO_3$ and $CH_3COO$, $3n$ is larger than $m$ and having a basicity $(m/3n \times 100)n$, the range of 30 to 83% and a multivalent anion (referred to as Y) having been chemically introduced in the basic salt, the amount of the anion Y being such that the molar ratio Y/M is more than about 0.015 but less than the amount impairing the stability of said basic salt (note e.g. U.S. Pat. No. 3,544,476), as primary sewage clarification treatments. The suspended organic matter, of course, was of different varieties and the Biological Oxygen Demand (BOD) of the waste was extremely high. Treatments of 1–10 ppm alone and in conjunction with 5 to 50 ppm of the coagulant aids reduced the JTU of the samples well below the required limits. In addition, the flocs of suspended matter were of such quality due to the polymer that they were easily filtered to provide a supernatant having a JTU of 5 which was considered to be quite good. The BOD level of the waste was lowered quite considerably and to the extent that the supernatant could be discharged directly to streams without violation of regulated restrictions. Treatments ranging from 1:1 to about 1:10 of polymer to suspended matter were found to be exceptionally effective.

Field evaluation of the polymers (Example 1) alone and in combination with the coagulant aids in the concentrations set forth above were utilized for influent water clarification in paper mills. Treatments of 1 to 2 ppm were quite effective in coagulating the suspended organic and inorganic matter to provide a supernatant containing varying amounts of suspended matter bearing absorbed polymer. Again, the remaining suspended matter because the absorbed polymer was of a floc quality was easily removed by filtration.

The following comprehensive study was conducted to illustrate the compatibility of the instant polymer with alum ($Al_2(SO_4)_3 \cdot 18H_2O$) and polyaluminum chloride and the results obtainable by the use of this combination.

The tests performed were similar to those earlier described in that a dosage of the particular coagulant or combination thereof was added to various samples of Lower Natchez Valley Authority River water containing suspended organic and inorganic matter and having the specified JTU reading. After a short period, the sample is subjected to a final JTU reading to establish the coagulant's effect.

The results of the respective tests are recorded in the following Tables.

TABLE 3A

| Product | Initial JTU = 56.0 | | | |
|---|---|---|---|---|
| | Dosage ppm | Polymer Dosage ppm | Alum Dosage ppm | JTU |
| Example 1 | 3 | 3 | — | 55 |
| " | 5 | 5 | — | 30 |
| " | 6 | 6 | — | 23 |
| Alum | 15 | — | 15 | 60 |
| Alum plus Example 1 (individual addition) | 18 | 3 | 15 | 60 |
| Blend of Example 1 and alum (1:5) | 12 | 2 | 10 | 48 |
| " | 15 | 2.5 | 12.5 | 24 |
| " | 18 | 3 | 15 | 13 |
| " | 21 | 3.5 | 17.5 | 10 |

TABLE 3B

| Product | Initial JTU = 58.0 | | | JTU after 1½ minutes |
|---|---|---|---|---|
| | Dosage ppm | Inorganic ppm | Polymer ppm | |
| Example 1 | 2.5 | — | 2.5 | 20 |
| Blend product of Ex. 1 and alum (1:5) | 9.0 | 7.5 | 1.5 | 48 |
| " | 12.0 | 10.0 | 2.0 | 42 |
| " | 15.0 | 12.5 | 2.5 | 28 |
| Blend of Ex. 1 with polyaluminum chloride (1:2) | 4.5 | 3 | 1.5 | 40 |
| " | 6.0 | 4 | 2.0 | 20 |
| " | 7.5 | 5 | 2.5 | 10 |
| Blend of Ex. 1 with polyaluminum chloride (1:5) | 6.0 | 5 | 1.0 | 50 |
| " | 9.0 | 7.5 | 1.5 | 30 |
| " | 12.0 | 10 | 2.0 | 11 |
| " | 15.0 | 12.5 | 2.5 | 6 |

*Polyaluminum chloride available as PAC-250-AD from TAKI Fertilizer Manufacturing Company Limited, Japan.

As evidenced by the above, the coagulant aids may be utilized quite successfully with the polymers when used for example, in a weight concentration of polymer to aid of from about 1:0.75 to 1:50. The respective materials may be added directly and independently to the aqueous system to be treated or may be added as a composition or mixture.

If the latter mode is desired for ease of manufacture, handling, and usage, the coagulant aid may simply be mixed with the polymer in the proportions desired, stirred to achieve a homogeneous solution or mixture and used. Since both ingredients are water-soluble, there is no significant problem in producing the product. Accordingly, if the product is to be composed of polyaluminum chloride or alum (50 parts by weight) and polymer (50 parts by weight) on an active basis, aqueous solutions thereof are simply added together, mixed well and are ready to use.

The ability of the instant polymers to be readily mixed with coagulant aids is unique with these polymers since this, for one reason or another, is not the case with cationic polymers which are presently being commercially used. If the commercial polymers were to be utilized in conjunction with coagulant aids, a two barrel treatment would generally be necessary. The coagulant aids, if mixed with cationic polymers under certain specific conditions, produce a one barrel stable product but there is always an attendant loss in efficacy for both the polymer and the coagulant aid. This is not the case with the present polymers.

The polymers of the invention possess certain uniqueness due to what is believed to be certain struc-

Having thus described the invention, what we claim is:

1. A water-soluble cationic polymer obtained by the polymerization of a epihalohydrin with an alkylene polyamine having the formula

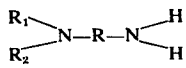

wherein R is a lower alkylene having from 2 to about 6 carbon atoms, and $R_1$ and $R_2$ are each a lower alkyl of from 1 to about 6 carbon atoms, the mole ratio of epihalohydrin to polyamine being from about 0.60:1 to about 2.7:1, said polymerization comprising reacting with the alkylene polyamine from about 50 to about 90 percent of the amount of epihalohydrin to be polymerized, allowing the reaction to continue until the reaction medium attains a substantially uniform viscosity, and reacting the remaining portion of the epihalohydrin incrementally to obtain the cationic polymer, the temperature of polymerization being from about 60° to about 120°C.

2. A polymer in accordance with claim 1 wherein the polymerization is carried out in an aqueous alkaline solution, and the reaction medium is acidified after the last increment of epihalohydrin is reacted.

3. A polymer in accordance with claim 2 wherein the epihalohydrin is epichlorohydrin, and the alkylene polyamine is from the group consisting of dimethylaminopropylamine, diethylaminopropylamine, N,N-dimethylaminoethylamine, N,N-diethylaminoethylamine.

4. A polymer in accordance with claim 3 wherein the polymerization is carried out in an aqueous alkaline solution, and the reaction medium is acidified after the last increment of epihalohydrin is reacted.

5. A polymer in accordance with claim 4 wherein the alkylene polyamine is dimethylaminopropylamine.

6. A polymer according to claim 1 wherein the ratio of the epichlorohydrin is from about 0.75:1 to about 1.3:1 and the polymerization temperature is from about 80° to 100°C.

7. A polymer in accordance with claim 6 wherein the polymerization is carried out in an aqueous alkaline solution having a pH of from about 8 to 11 and the reaction medium is acidified to a pH of from about 2 to 5 after the last increment of epihalohydrin is reacted.

8. A polymer in accordance with claim 7 wherein the epihalohydrin is epichlorohydrin and the alkylene polyamine is from the group consisting of dimethylaminopropylamine, diethylaminopropylamine, N,N-dimethylaminoethylamine, N,N-diethylaminoethylamine.

9. A polymer according to claim 8 wherein the polyalkylene amine is dimethylaminopropylamine.

10. A polymer according to claim 9 wherein the polymerization temperature is approximately 90°C.

* * * * *